United States Patent Office 3,092,641
Patented June 4, 1963

3,092,641
DIELS-ALDER ADDUCTS OF PERCHLORO-
COUMALIN
Edward Leon, Tonawanda, N.Y., assignor to Hooker
Chemical Corporation, Niagara Falls, N.Y., a corporation of New York
No Drawing. Filed Apr. 30, 1958, Ser. No. 731,851
18 Claims. (Cl. 260—343.2)

This invention relates to new compositions of matter and to methods of preparation of said compounds. More specifically, this invention relates to the preparation of halogenated polycyclic organic compounds by the Diels-Alder reaction of perchorocoumalin as the diene, and an organic olefin selected from the group consisting of neutral olefins and acidic olefins as the dienophile.

The following equations, wherein maleic anhydride is used as a typical dienophile, represents the probable typical course of the reaction.

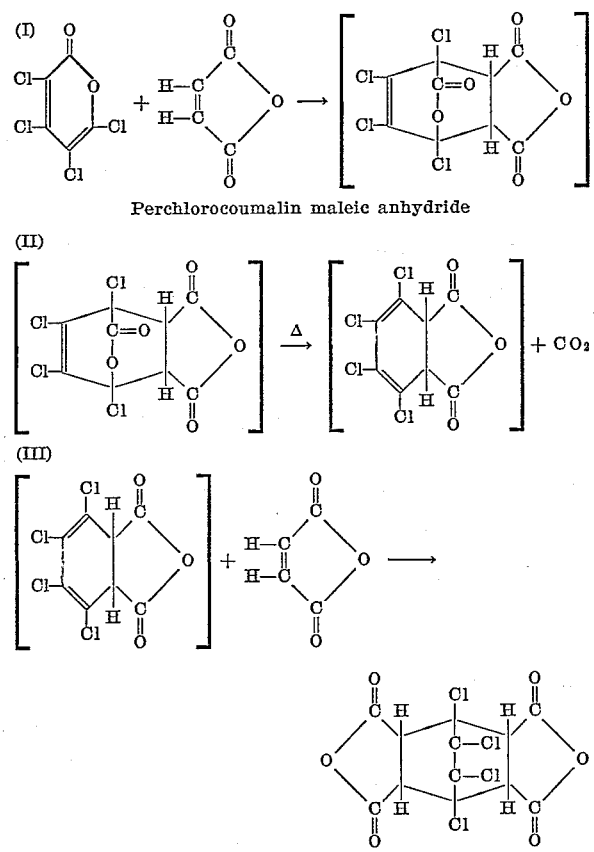

Perchlorocoumalin maleic anhydride

The reaction generally proceeds directly to the final product, i.e., undergoes the double Diels-Alder reaction; however, if the intermediate compounds can be isolated they could be made to enter into a Diels-Alder reaction with any organic olefin of the class described.

For purposes of this specification and claims, the reaction product of one mole of perchlorocoumalin per one mole of dienophile is designated a mono-adduct; the reaction product of one mole of perchlorocoumalin per two moles of dienophile is designated a di-adduct.

The compounds which are the subject of this invention are useful in the plastics industry, for example in the preparation of alkyds, in the preparation of elastomers, in the preparation of polyesters, as hardeners for epoxy resins and in the preparation of foamed products, wherein the gas necessary for foaming may be supplied by the $CO_2$ evolved in these reactions or by any conventional means. Esters prepared from the products of the present invention find utility as plasticizers, synthetic lubricants and high temperature greases. Unsaturated esters prepared from the products of the present invention find utility in the plastics industry, e.g., the tetra allyl ester of the product shown in Equation III, supra, and named in Example 3, infra. They are further useful to produce other valuable materials which may have a variety of uses.

The perchlorocoumalin utilized in the process of this invention may be prepared by any desired method and may be satisfactorily prepared by the following route. Octachlorocyclopentene is warmed with concentrated sulfuric acid and the resulting hexachloro-2-pentenone layer is separated and added to an aqueous solution of sodium hydroxide to form the sodium salt of cis-pentachloropentadienoic acid. The free acid is generated by acidification of the sodium salt with a mineral acid and the cis-pentachloropentadienoic acid, which can be isolated by filtration or extraction, is then subjected to elevated temperature to effect the preparation of perchlorocoumalin. The reaction may be illustrated as follows:

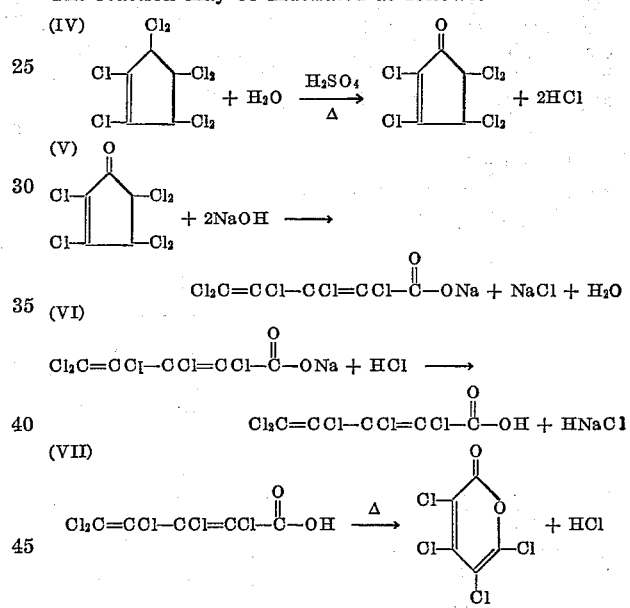

Contamination of the perchlorocoumalin product with a by-product can be prevented by putting the cis-pentachloropentadienoic acid through a hot tube at short retention time. This concept is a novel one and its advantages are illustrated by a comparison of Examples 1 and 2, infra.

By virtue of the Diels-Alder reaction disclosed above, perchlorocoumalin has many novel applications, especially in the plastics industry. For example, a linear polymer which contains carbon-to-carbon double bonds susceptible to a Diels-Alder reaction with perchlorocoumalin may be hardened by cross-linking and foamed simultaneously by the $CO_2$ evolved when the linear polymer is heated with perchlorocoumaline. This process is illustrated by the following equation where "R" designates a linear polymer chain radical:

(VIII)

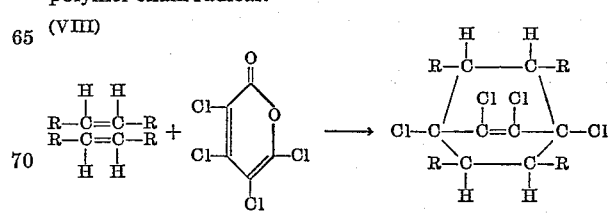

Another example of the application of the Diels-Alder reaction of perchlorocoumalin in the plastics industry is that of producing a liquid linear polymer mix which can be shaped to the desired form and hardened in place by heat without the use of catalysts. This application consists of allowing perchlorocoumalin to react with a linear polymer which contains carbon-to-carbon double bonds and stopping the reaction by cooling just prior to the last Diels-Alder step. This process is illustrated by the following equation:

(IX)

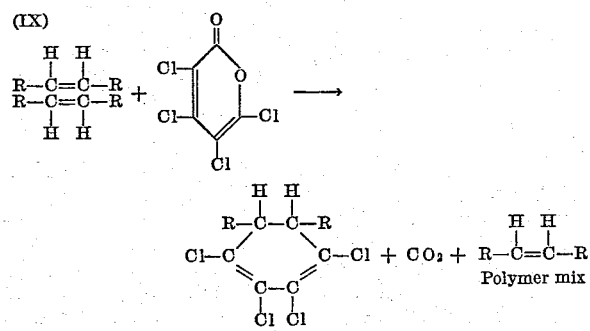

The fluid polymer mix is then shaped by conventional means, such as placing in a mold, impregnation of a filler, etc., and heated to effect the last Diels-Alder step thereby hardening the polymer by cross-linking. The hardening step is illustrated by the following equation:

(X)

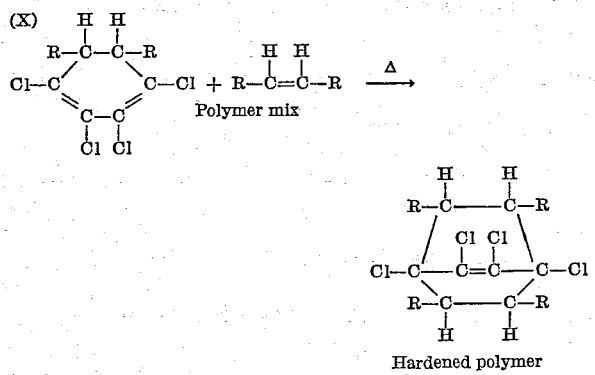

The adduction process of this invention is carried out in the liquid phase either with or without a solvent. The temperature needed to carry out the process of this invention is a function of the particular dienophile employed. For example, the reaction of perchlorocoumalin with cyclopentadiene proceeds at about fifty degrees centigrade, whereas a temperature of one hundred and thirty degrees centigrade is necessary before the reaction of perchlorocoumalin with maleic anhydride will proceed at a satisfactory rate. When the reactions proceed slowly temperatures above two hundred degrees centigrade are to be avoided because of the gradual decomposition and/or rearrangement of perchlorocoumalin above two hundred degrees centigrade. The use of superatmospheric pressures, generally up to about two hundred atmospheres, is desirable, although not necessarily essential, when volatile dienophiles are employed at elevated temperatures for the process of the present invention. The time required for the reaction is naturally at least partially dependent on the temperature, pressure, concentration, and whether or not a solvent is used; said time may vary from a few minutes to several days. The process is generally carried out using the theoretical molar ratios but the rate of the reaction may be increased in some cases by using an excess of one of the reactants.

The dienophiles that are contemplated by the present invention can be classified as organic neutral olefins and organic acidic olefins. Examples of olefins that have the structure required for yielding the Diels-Alder adducts of the present invention include: carboxylic compounds such as maleic acid, methyl acrylate, fumaric acid, ethyl maleic acid, itaconic acid, mesaconic acid, maleimide, dimethyl fumarate, citraconic acid, linoleic acid, acrylamide, etc., it being understood that the acid anhydrides may be substituted for the acids; unsaturated unsubstituted hydrocarbons such as cyclopentadiene, dicyclopentadiene, bicycloheptadiene, styrene, ethylene, propylene, cyclohexene, butadiene, etc.; unsaturated aldehydes or ketones such as acrolein, methyl allyl ketone, 2-cyclohexenone, etc.; unsaturated ethers such as methyl vinyl ether, diallyl ether, dihydrofuran, 1,4-dioxadiene, butylene oxide, etc.; unsaturated mercaptans, sulfides, disulfides, or polysulfides, such as allyl mercaptan, diallyl sulfide, methyl vinyl sulfide, diallyl disulfide, diallyl polysulfide, etc.; unsaturated sulfoxides and sulfones such as methyl allyl sulfone, methyl allyl sulfoxide, sulfolene, methyl vinyl sulfone, methyl vinyl sulfoxide, etc.; unsaturated acohols such as allyl alcohol, 2-butene-1,4-diol, 2-cyclohexenol, 2-pentene-1,4,-diol, 2-chloro-2-butene-1,4-diol, etc.; polymers containing unsaturation such as polyesters containing maleic or fumaric ester linkages, etc.; unsaturated nitriles such as acrylonitrile, ω-phenyl acrylonitrile, 2-cyclohexyl cyanide, etc.; unsaturated halides such as vinyl chloride, allyl chloride, 2-cyclohexyl chloride, 1,4-dichloro-2-butene, etc.

In order that those skilled in the art may have sufficiently detailed instructions in practicing the process of the present invention and in making the new compounds of this invention, the following examples will illustrate typical procedures. This detailed disclosure is not to be construed as limiting the scope of the present invention as further indicated elsewhere herein.

*Example 1.—Preparation of Perchlorocoumalin*

A three necked, round bottom flask was fitted with a thermometer, mechanical stirrer and reflux condenser. The top of the reflux condenser was attached to a water trap to absorb the hydrogen chloride evolved during the reaction. The flask was charged with four thousand five hundred and twenty grams of concentrated sulfuric acid and three thousand and ninety-six grams of octachlorocyclopentene which had previously been purified by recrystallization from acetone. The reaction mixture was heated to one hundred and five degrees centigrade and stirred vigorously until six hundred and fifty-seven grams of hydrogen chloride had been evolved. The flask was then cooled and the upper hexachloro-2-pentenone layer was separated from the lower sulfuric acid layer.

The two thousand six hundred and one grams of crude hexachloro-2-pentenone thus obtained was added slowly to a stirred solution of eight thousand six hundred and forty grams of a 10.0 percent aqueous sodium hydroxide solution. The reaction mixture was held at about twenty-five degrees centigrade by external cooling. The resulting aqueous solution was acidified with one thousand seven hundred and ninety ml. of concentrated hydrochloric acid. The twenty-four hundred grams of cis-pentachloropentadienoic acid which precipitated was isolated by filtration and dried.

The cis-pentachloropentadienoic acid was placed in a flask fitted with a distillation apparatus and heated. Hydrogen chloride began to evolve at about one hundred and fifty degrees centigrade. The temperature was held from about one hundred and fifty to one hundred and eighty degrees centigrade until hydrogen chloride evolution ceased. The temperature was then raised and the product was distilled until the distillation pot was dry. The distillate was then returned to the pot and the distillation repeated. Most of the product distilled at about two hundred and sixty-five degrees centigrade/1 atm. The crude perchlorocoumalin thus obtained was purified by recrystallization from n-hexane. The n-hexane was removed from the filtrate by distillation. The residue, about three hundred and fifty grams, was a liquid, the major portion of which was identified as a compound having the same empirical formula as perchlorocoumalin.

An infrared spectrum of a pure sample of this by-product was obtained as a standard for identification in other experiments. The solid perchlorocoumalin was again recrystallized from n-hexane to give one thousand and fifty-six grams of pure perchlorocoumalin.

*Example 2.—Improved Preparation of Perchlorocoumalin*

Twenty-five grams of cis-pentachloropentadienoic acid was dissolved in two hundred and fifty ml. of carbon tetrachloride. The solution was dropped into a tube heated to three hundred degrees centigrade at the rate of two ml./min. The effluent was condensed and the carbon tetrachloride was removed by distillation. Infrared analysis of the residual product showed it to be uncontaminated by the compound having the same empirical formula as perchlorocoumalin and referred to in Example 1.

The following examples represent illustrative Diels-Alder adducts.

*Example 3*

A three-necked, round bottom flask was charged with thirty-five grams of perchlorocoumalin, fourteen and seven-tenths grams of maleic anhydride, and twenty-five grams of chlorobenzene as a solvent therefor. The flask was fitted with a thermometer, nitrogen inlet tube and a reflux condenser. A tube containing calcium chloride was attached to the top of the condenser and the calcium chloride tube in turn led to a trap containing about three hundred ml. of water. The purpose of the trap was to catch any HCl that may be evolved from the reaction mixture. The reaction mixture was heated to about one hundred and fifty-two degrees centigrade for approximately two days, and at the end of this time, the reaction mixture had become darkened and large crystals were present in the bottom of the flask. The system was cooled, flushed with nitrogen, and the large crystals isolated by filtration, washed with benzene and dried.

The product was analyzed and was found to be the tetrabasic dianhydride, 1,4,7,8-tetrachloro-(2.2.1)-bicyclo-7-octene-2,3,5,6-tetracarboxylic dianhydride, hereinafter referred to as the dianhydride adduct. The compound is shown as follows:

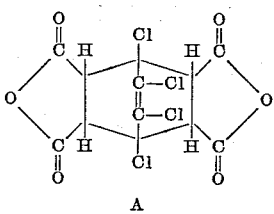

A

It is an odorless, colorless, or very light amber solid, partially soluble in acetone, ethyl acetate, toluene and carbon tetrachloride. Its molecular weight is three hundred and eighty-six and it melts with decomposition at three hundred and twenty degrees centigrade. *Analysis.—* Calculated for $C_{12}H_4Cl_4O_6$: Cl, 36.7%; equivalent weight, 96.5. Found: Cl. 36.4%; equivalent weight, 98.7.

The example which follows illustrates an improved method of preparing the dianhydride adduct.

*Example 4*

A flask fitted with a thermometer and distillation apparatus was charged with two thousand six hundred and fifty-three grams of maleic anhydride and one liter of dried chlorobenzene. The chlorobenzene was distilled until the distillate was clear, i.e., no more water in the distillate, thereby insuring the conversion of any maleic acid present to maleic anhydride. Distillation was continued until the flask temperature reached one hundred and fifty degrees centigrade. After a reflux condenser was substituted for the distillation apparatus, one thousand and fifty-six grams of perchlorocoumalin was added and the temperature was held at about one hundred and fifty degrees centigrade until carbon dioxide evolution ceased. The total reaction time was about ten hours.

The flask was cooled to about seventy-five degrees centigrade and about 2.5 liters of benzene was added. The solid dianhydride adduct was isolated by filtration, washed with boiling benzene, recrystallized from a benzene-acetone solution, and dried in an oven at one hundred and fifty degrees centigrade. The yield of dianhydride adduct thus obtained was one thousand four hundred and ten grams.

*Example 5*

A flask containing two hundred and thirty-four grams of perchlorocoumalin, eighty-seven grams of methyl acrylate and 1.25 grams of hydroquinone as a stabilizer was heated between one hundred and fifteen degrees centigrade and one hundred and fifty degrees centigrade, for six hours. Recrystallization from n-hexane yielded one hundred and ninety-seven grams of methyl 2,3,4,5-tetrachloro-1,2-dihydrobenzoate, M.P. seventy-four to seventy-six degrees centigrade. *Analysis.*—Calculated for $$C_8H_6Cl_4O_2:Cl$$

51.4.%. Found: Cl, 50.6%. Its structural formula is the following:

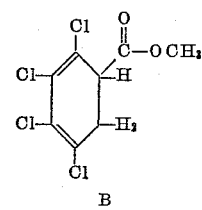

B

Examples 6, 7, and 8, following, illustrate various products which can be obtained from the reaction of perchlorocoumalin and cyclopentadiene.

*Example 6*

A flask was charged with two hundred and thirty-four grams of perchlorocoumalin, two hundred ml. of petroleum ether and one hundred ml. of benzene. The solution was heated at reflux, forty-nine degrees centigrade, and sixty-six grams of cyclopentadiene was added dropwise over a period of one and one-half hours. The contents of the flask were held at forty-nine degrees centigrade for four additional hours. Cooling to −20 degrees centigrade gave two hundred and fifty-eight grams of the one to one Diels-Alder adduct corresponding to the product of the following equation:

(XI)

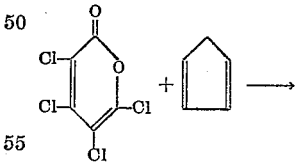

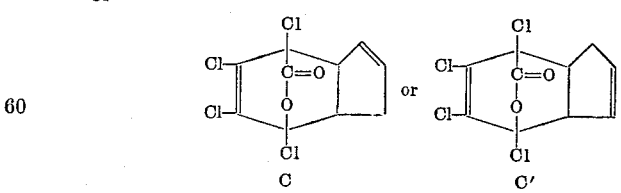

C        C′

*Analysis.*—Calculated for $C_{10}H_6Cl_4O_2$: Cl, 47.2%. Found: Cl, 47.2%.

*Example 7*

A flask was charged with forty-six and eight-tenths grams of perchlorocoumalin, fifty ml. of petroleum ether and sixty ml. of benzene. The solution was heated to fifty degrees centigrade and 13.2 grams of cyclopentadiene was added slowly. Heating at about fifty degrees centigrade was continued for a total of 5.5 hours. Most of the solvent was then removed and heating from one hundred to one hundred and ten degrees centigrade was continued for eight hours. Crystallization from n-hexane yielded 20.4 grams of product which was identified as 4,5,6,7-tetrachloroindane. The reactions may be shown as follows:

(XII)

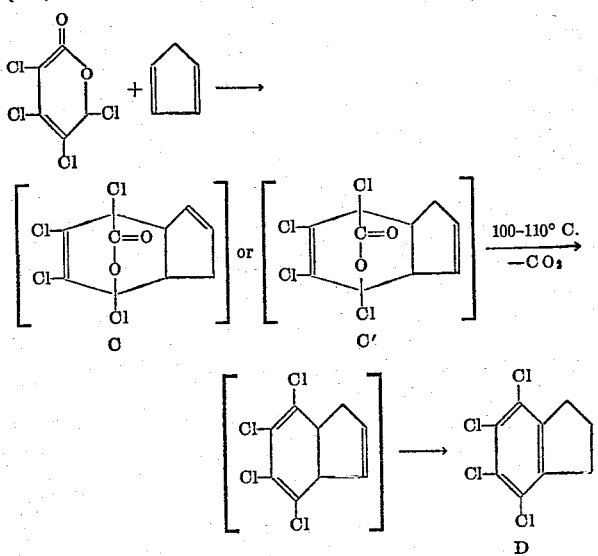

Example 8

When thirty grams of the one to one Diels-Alder adduct C or C' was heated suddenly to one hundred and sixty degrees centigrade, eleven grams of a compound corresponding to structure E or E' was isolated in addition to 4,5,6,7-tetrachloroindane. Compound E or E' had a melting point of one hundred and sixty-two point nine to one hundred and sixty-eight point five degrees centigrade. Analysis.—Calculated for $C_{18}H_{12}Cl_8$: Cl, 55.4%; M.W., 512. Found: Cl, 54.8%, M.W., 490+. The reaction may be shown as follows:

(XIII)

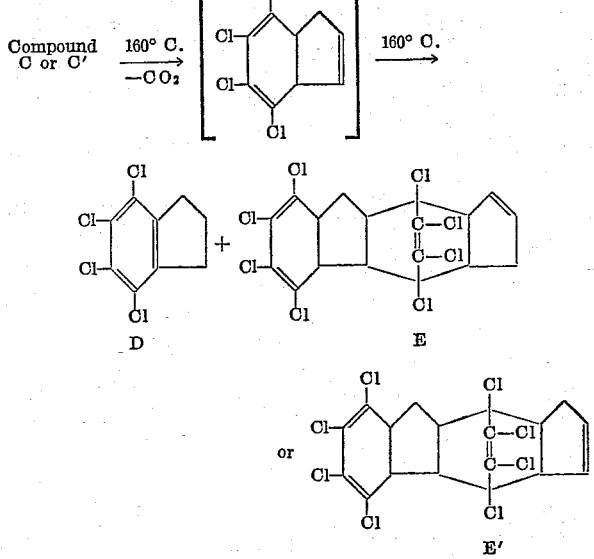

Example 9

A flask was charged with 46.8 grams of perchlorocoumalin, 26.4 grams of dicyclopentadiene, one hundred ml. of petroleum ether (B.P. thirty-five to fifty degrees centigrade) and one hundred ml. of n-hexane. The charge was heated at reflux, fifty-six degrees centigrade for eleven hours. The solid (eight grams) which precipitated during refluxing was isolated by filtration. It was identified as the one to one Diels-Alder adduct. The possible structures F, F', F'', F''', are shown below.

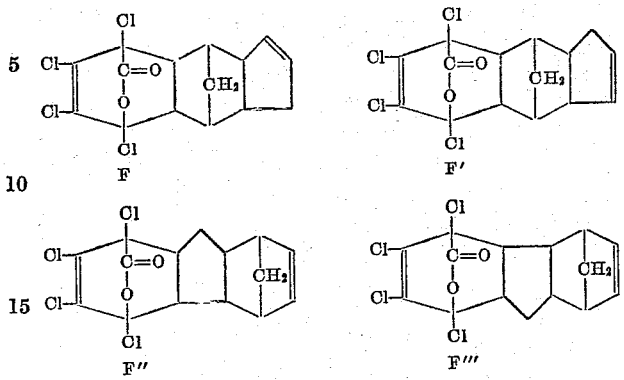

The one to one adduct has a melting point of one hundred and seventy to one hundred and seventy-seven degrees centigrade with decomposition. Analysis.—Calculated for $C_{15}H_{12}Cl_4O_2$: Cl, 38.7%. Found: Cl, 38.5%.

Concentration and cooling of the filtrate yielded 40.1 grams of a product which had a melting point range of 61.8–94.8 degrees centigrade with decomposition, and which contained 49.8% chlorine.

Example 10

A flask charged with 46.8 grams of perchlorocoumalin, 36.9 grams of bicycloheptadiene, and fifty ml. of petroleum ether was heated at fifty-five degrees centigrade for eighteen hours. The flask was then cooled to −40 degrees centigrade, and the solid which precipitated was isolated by filtration. The product weighed 32.5 grams, had a melting point of seventy-seven to one hundred and one degrees centigrade with decomposition, and contained 50.6 percent chlorine. Infra-red analysis showed perchlorocoumalin to be absent from the product.

Example 11

A suspension of one hundred grams perchlorocoumalin and 82.2 grams cyclopentadiene was stirred with fifty ml. low boiling petroleum ether at reflux. All solids went into solution in fifteen minutes and then after one-half hour the solid adduct, C or C', as shown in Example 6, separated. The mono adduct weighing one hundred and seventeen grams (M.P., one hundred and five to one hundred and seven) was collected. This adduct (58.9 grams) was then treated with 19.3 grams maleic anhydride and one hundred ml. chlorobenzene, and, after heating to one hundred and ten degrees centigrade, $CO_2$ was slowly evolved. After two hours the temperature was raised to one hundred and forty degrees centigrade. Heating was continued for one and one-half hours until $CO_2$ evolution ceased. Upon cooling a crystalline solid was collected which weighed twenty-three grams, and which had a melting point of one hundred and ninety-five to one hundred and ninety-seven. Analysis.—Calculated for $C_{13}H_8Cl_4O_3$: Cl, 40.4%. Found: Cl, 39.9%. This product is the mixed adduct of perchlorocoumalin 4,7,8,9-tetrachloro - 2,7 - etheno-3a,4,5,6,7,7a-hexahydroindene-5,6-dicarboxylic anhydride of structure G below.

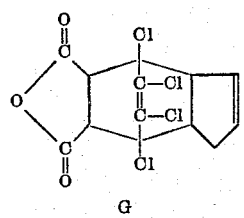

The following example illustrates that basic olefins will not form the Diels-Alder adducts of the present invention.

Example 12

A flask is charged with 23.4 grams of perchlorocoumalin and 11.4 grams of allyl amine and heated on a steam bath. The reaction mixture becomes black. Allyl amine hydrochloride is the only non-tarry organic product that can be isolated.

The following examples illustrate the utility of the adducts of the present invention in the plastics industry.

Example 13

The following shows the utility as a hardener for epoxy compounds.

A solution of one hundred and eighty grams of dianhydride adduct, two hundred grams of Araldite 6020 (a liquid epoxy resin marketed by Ciba Company) and three hundred and sixty grams of methyl ethyl ketone was heated and stirred vigorously for four hours at the reflux temperature. Fiberglas cloth was impregnated with this solution, and dried in an oven at one hundred degrees centigrade for two to four minutes. A laminate was prepared by pressing twelve sheets of the cloth as treated above at one hundred and seventy-eight to one hundred and eighty degrees centigrade, for one hour. The laminate was post-cured for four hours at one hundred and eighty degrees centigrade in a mechanical convection oven. The following are some of the properties of the resulting laminate:

| Room Temperature | | 350° F. | | 500° F. | |
|---|---|---|---|---|---|
| Flexural Strength (p.s.i.) | Flexural Modulus (p.s.i.) | Flexural Strength (p.s.i.) | Flexural Modulus (p.s.i.) | Flexural Strength (p.s.i.) | Flexural Molulus (p.s.i.) |
| 77,360 | $3.37 \times 10^6$ | 10,050 | $0.93 \times 10^6$ | 5,190 | $0.71 \times 10^6$ |

The following shows the utility in the preparation of polyesters.

Example 14

To 10.0 parts of the dianhydride adduct, as obtained in Example 4, was added 5.170 parts of bis(2-hydroxyethyl) maleate. The solution was warmed for approximately twenty minutes in a one hundred and fifty degree centigrade oil bath, after which time a polyester gel formed.

This invention may be embodied in other forms or carried out in other ways, without departing from the spirit or essential characteristics thereof. The present embodiment is therefore to be considered as in all respects illustrative, and not restrictive, the scope of the invention being indicated by the appended claims, and all changes which come within the meaning and range of equivalency of the claims are intended to be embraced therein.

I claim:

1. A compound selected from the group consisting of the Diels-Alder mono- and di-adducts of perchlorocoumalin and, as the dienophile, an olefinic compound selected from the group consisting of lower alkadienes, lower cycloalkadienes having no more than two fused rings, methylacrylate, dimethyl fumarate, maleic acid, fumaric acid, ethylmaleic acid, itaconic acid, mesaconic acid, citraconic acid, and linoleic acid and the corresponding anhydrides of the acids, and mixtures thereof.

2. The composition according to claim 1 wherein the dienophile is lower alkadiene.

3. The composition according to claim 1 wherein the dienophile is lower cycloalkadiene having no more than two fused rings.

4. A compound selected from the group consisting of the Diels-Alder mono- and di-adducts of perchlorocoumalin and maleic anhydride.

5. A compound selected from the group consisting of the Diels-Alder mono- and di-adducts of perchlorocoumalin and methylacrylate.

6. A compound selected from the group consisting of the Diels-Alder mono- and di-adducts of perchlorocoumalin and cyclopentadiene.

7. A compound selected from the group consisting of the Diels-Alder mono- and di-adducts of perchlorocoumalin and dicyclopentadiene.

8. A compound selected from the group consisting of the Diels-Alder mono- and di-adducts of perchlorocoumalin and bicycloheptadiene.

9. A compound selected from the group consisting of the Diels-Alder mono- and di-adducts of perchlorocoumalin and butadiene.

10. The process which comprises preparing a Diels-Alder adduct by reacting together perchlorocoumalin as the diene, and an olefinic compound selected from the group consisting of lower alkadienes, lower cycloalkadienes having no more than two fused rings, methylacrylate, dimethyl fumarate, maleic acid, fumaric acid, ethylmaleic acid, itaconic acid, mesaconic acid, citraconic acid, and linoleic acid and the corresponding anhydrides of the acids, and mixtures thereof as the dienophile, at a temperature of less than two hundred degrees centigrade wherein the reaction takes place in the liquid phase.

11. The process according to claim 10 wherein the dienophile is maleic anhydride.

12. The process according to claim 10 wherein the dienophile is methylacrylate.

13. The process according to claim 10 wherein the dienophile is lower alkadiene.

14. The process of claim 13 wherein the lower alkadiene is butadiene.

15. The process according to claim 10 wherein the dienophile is lower cycloalkadiene having no more than two fused rings.

16. The process of claim 15 wherein the lower cycloalkadiene is cyclopentadiene.

17. The process of claim 15 wherein the lower cycloalkadiene is dicyclopentadiene.

18. The process of claim 15 wherein the lower cycloalkadiene is bicycloheptadiene.

References Cited in the file of this patent

UNITED STATES PATENTS

| | | |
|---|---|---|
| 2,454,349 | Schwerdle | Nov. 23, 1948 |
| 2,454,351 | Sowa et al. | Nov. 23, 1948 |
| 2,615,008 | Greenlee | Oct. 21, 1952 |
| 2,668,807 | Greenlee | Feb. 9, 1954 |
| 2,687,417 | Rucker | Aug. 24, 1954 |
| 2,781,393 | Heckert et al. | Feb. 12, 1957 |
| 2,794,794 | Schlatter et al. | June 4, 1957 |
| 2,823,197 | Morris et al. | Feb. 11, 1958 |
| 2,829,147 | Molotsky et al. | Apr. 1, 1958 |

OTHER REFERENCES

Elderfield: Heterocyclic Compounds, vol. 1, pp. 354–355, J. Wiley and Sons, New York (1950).